United States Patent [19]

Johnson

[11] Patent Number: 5,513,871

[45] Date of Patent: May 7, 1996

[54] GOOSENECK TRAILER HITCH LOCKING DEVICE

[76] Inventor: Charles T. Johnson, Rte. 1, Box 8 AB, Grandview, Tex. 76050

[21] Appl. No.: 488,497

[22] Filed: Jun. 9, 1995

[51] Int. Cl.$^6$ ....................................................... B60D 1/60
[52] U.S. Cl. ............................................................. 280/507
[58] Field of Search .................................. 280/507, 423.1, 280/511, 512; 70/14, 258

[56] References Cited

U.S. PATENT DOCUMENTS

| | | | |
|---|---|---|---|
| 3,226,133 | 12/1965 | Geresy | 280/507 |
| 3,233,913 | 2/1966 | Brown | 280/507 |
| 4,141,569 | 2/1979 | Dilk | 280/507 |
| 4,691,935 | 9/1987 | Brandt | 280/507 |
| 5,087,064 | 2/1992 | Guhlin | 280/507 |
| 5,181,405 | 1/1993 | Wheeler | 70/232 |
| 5,222,755 | 6/1993 | O'Neal | 280/507 |
| 5,255,545 | 10/1993 | Wheeler | 70/232 |
| 5,322,316 | 6/1994 | Wheeler | 280/507 |

*Primary Examiner*—Kevin T. Hurley
*Attorney, Agent, or Firm*—Richard C. Litman

[57] ABSTRACT

An anti-theft device which obstructs the socket and coupler lever of a gooseneck trailer hitch coupling mechanism and prevents a gooseneck trailer from being towed, made up of a receiving device and a pair of upright members each permanently affixed to a plate. The plate is dimensioned to match the footprint of the coupler. The receiving device is adapted to matingly engage with the socket. A first upright member and a second upright member are each affixed at a right angle to the plate on the same side of the plate as the receiving device and parallel to each other at a predetermined distance so that, when the receiving device is inserted into an open socket, the first upright member and second upright member extend contiguously upward on opposite sides of the coupler lever. A handle is affixed to the underside of the plate for single-handed insertion. The upright members are formed so that the upper end forms a "U"- channel, dimensioned to snugly accept the body of a padlock. Each upright member includes an opening in registry with the other, dimensioned to accept a securing bolt. The bolt when inserted through the registered openings of upright members prevents operation of the coupler lever. The bolt includes a bore to accept the shackle of a padlock or other similar lock, which secures the securing bolt onto the upright members. The padlock is also protected from being cut by the "U"-shaped channel.

14 Claims, 5 Drawing Sheets

GOOSENECK TRAILER HITCH LOCKING DEVICE

BACKGROUND OF THE INVENTION

1. FIELD OF THE INVENTION

The present invention relates to an anti-theft device which obstructs the socket and coupler lever of a gooseneck trailer hitch coupling mechanism and prevents the gooseneck trailer from being towed.

2. DESCRIPTION OF THE PRIOR ART

Anti-theft devices intended to protect against theft of an unattended and unhitched trailer are abundant in the prior art. Although trailer hitches commonly use one of three standard varieties of hitches (ball and socket type hitches, king-pin hitches, and gooseneck hitches) many of these anti-theft devices incorporate a means of blocking the socket of a trailer hitch coupling mechanism. However, each type of trailer hitch presents unique differences which result in different conceptual approaches to protect a trailer from being towed.

For example, the typical gooseneck trailer hitch is made up of an irregular or non-symmetrical coupler foot plate attached to the lower end of a generally vertical post, the upper end of which post is attached to the trailer. Such a gooseneck coupling mechanism is significantly different from tongued trailers, the type which are commonly recognized for trailering boats. Whereas tongued trailers are generally horizontally configured, the trailer tongue being in the same plane as the coupling mechanism which connects with a receiving device on a pull vehicle, the post in gooseneck hitches may have a horizontal beam attached at a right angle to the upper end of the post, which horizontal beam attaches to the front of the trailer.

The coupler at the lower end of the post generally connects with a receiving device on a pull vehicle. The gooseneck trailer coupler itself is made up of front and rear facing portions of various configurations, one portion usually including a lever that operates the coupler. The coupler lever is generally made up of a cylindrical bar having a vertical component which penetrates an aperture in the foot plate of the coupler and a horizontal component at its upper end by which the user may grasp the lever.

To couple a gooseneck trailer to a pull vehicle, requires manipulation of the coupler lever. Manipulation is usually performed by initially raising the coupler lever vertically so that vertical component is removed from the aperture in the foot plate, thereby allowing the securing mechanism to be positioned to either accept or release the receiving device of the pull vehicle ("open" position). After the socket has received the receiving device on the pull vehicle, the coupler lever is released, whereupon the vertical component again is received by the foot plate aperture, thereby returning the coupler lever to its original resting position ("closed position").

The following patents are illustrative of various devices which apply the concept of blocking a receiving socket of a tongued trailer. U.S. Pat. No. 4,141,569 issued Feb. 27, 1979 to Dilk describes an anti-theft device for a tongued trailer which utilizes a receiving ball covered by a steel box with a hinged cover acting in combination with a padlock. A receiving ball is affixed on the bottom plate of an open topped steel box wherein one of the end plates is removed so as to enable the box to receive the trailer tongue and coupler. When the receiving ball receives the trailer socket, a second covering plate is fitted over the top of the trailer coupling mechanism to encase the coupling mechanism. The covering plate and the box interact so that the padlock both secures the box and is partially encased exposing only the key opening of the lock, further preventing tampering with the padlock.

U.S. Pat. No. 3,226,133 issued Dec. 28, 1965 to Geresy describes various embodiments of a combination of separate elements which obstruct the coupling socket of a tongued trailer hitch. A characteristic embodiment is made up of a ball with a bore, a headed pin of a length greater than the bore length which is stopped in the bore by its head, and a slidable cover plate. The elements act together by inserting the pin through the ball, inserting the ball into the socket, and sliding the plate onto flanges on the trailer hitch so as to cover the ball. With the plate in place, a hole in the plate allows the pin to drop partially through the plate until the head at the other end of the pin and bore prevents further dropping. A padlock is then slipped through a hole in the pin to secure the assembly in place.

U.S. Pat. No. 5,087,064 issued Feb. 11, 1992 to Guhlin shows a safety device using an upright bar, plate and padlock combination to prevent de-coupling of a trailer from a ball-hitch.

A major disadvantage associated with these particular anti-theft devices is that they are inappropriate for use with a gooseneck trailer hitch because none can encompass the vertical post.

U.S. Pat. No. 3,233,913 issued Oct. 1, 1962 to Brown describes a ball and chain combination to obstruct a house-trailer tongue coupling socket. The ball is inserted into the trailer hitch socket and locked in place in a conventional manner using a padlock on the trailer coupling mechanism. The chain is arranged through cooking gas tank handles found on the tongue of the trailer so as to prevent their theft. U.S. Pat. No. 5,222,755 issued Jun. 29, 1993 to O'Neal also describes a ball and chain in combination with padlock for a gooseneck trailer hitch (see FIG. 4 of '755 patent). The chain wraps through a coupler lever and is secured by the padlock. Although a ball and chain arrangement could accommodate almost any trailer hitch, the chain can be easily cut with bolt cutters. The ball is also left exposed to attack by prying, where an unsuccessful attempt may leave the coupling mechanism damaged.

U.S. Pat. No. 5,181,405 issued Jan. 26, 1993 to Wheeler, and U.S. Pat. No. 5,255,545 issued Oct. 26, 1993 also to Wheeler, describe a locking device specifically adapted for use with a gooseneck trailer. A slidable plate cooperates with a lock-body that, when aligned, receives a locking pin to secure the plate and lock body. The locking pin is in turn locked by insertion of a padlock. The system creates a box-like structure that obstructs the receiving socket of a gooseneck trailer. However, this device has the disadvantage of having multiple lock-body parts, which can get lost and which require alignment and assembly using at least two hands. Furthermore, the device's lock-bodies offer only one line of defense by only slidably obstructing the socket of the coupler. For example, the device fails to disable the securing mechanism by lacking a means which obstructs and locks the coupler lever, nor does it supply a receiving device which blocks the socket at the bottom of the post, nor does it provide a means of protecting a padlock from bolt cutters.

Therefore, it is apparent that a need still exists for a unitary anti-theft device that obstructs the socket and coupler lever of a gooseneck trailer hitch coupling mechanism and prevents the gooseneck trailer from being towed.

None of the above inventions and patents, taken either singly or in combination, is seen to describe the instant invention as claimed.

SUMMARY OF THE INVENTION

The present invention relates to an anti-theft device which obstructs the socket and coupler lever of a gooseneck trailer hitch coupling mechanism and prevents a gooseneck trailer from being towed. The preferred embodiment of the present invention is made up of a receiving device, a pair of upright members, and a handle, each permanently affixed to a plate, said plate having an topside and an underside. The plate is elongated and dimensioned to generally match the footprint of a coupler of a gooseneck trailer hitch. The receiving device is adapted to matingly engage with a socket of the gooseneck trailer hitch. Each of the upright members, comprising a first upright member and a second upright member, are affixed at a right angle to the plate on the same side of the plate as the receiving device. The first upright member and second upright member are affixed parallel to each other, spaced a predetermined distance so that, when the receiving device is inserted into the socket with the securing mechanism in an open position, the first upright member and second upright member extend contiguously upward on opposite sides of the coupler lever. A handle is affixed to the underside of the plate for easy single-handed insertion of the assembly into the socket. The entire assembly is preferably made of tempered steel.

To install the anti-theft device, the user grasps the handle with one hand, while positioning the coupler lever as described above with the other hand to the open position. The receiving device is inserted from below the coupler into the socket, while simultaneously positioning the coupler lever between each of the upright members. While the receiving device is fully seated in the socket with the coupler lever in the open position, the coupler lever is in a temporary position in which the horizontal component of the coupler lever is being held at a point above the ends of the upright members. When the coupler lever is released from the open to the closed position, the coupler lever returns to its resting position, which places the horizontal-component of the lever at a point below the upper end of the upright members.

Once the anti-theft device has been so inserted and is engaged in the closed position, the device must be secured to prevent removal when reversing the installation procedure described above. Each of the pair of upright members, each having a lower end and an upper end, are formed so that the upper end forms a "U"-shaped channel. The "U"-shaped channel is generally dimensioned to accept standard padlocks or similar locks so that a padlock body fits snugly within the channel. Each of the upper ends of the upright members include openings in registry with the other, dimensioned so as to accept a securing bolt, which registered openings are positioned immediately above the horizontal component of the coupler lever when in its resting position. The securing bolt has a head and a shaft with a distal end, and may be, for convenience, suspended by a chain from the anti-theft device itself. The distal end includes a bore to accept the shackle of a padlock or other similar lock.

To secure the anti-theft device in place, the securing bolt is first inserted through the registered openings above the horizontal component of the coupler lever. The securing bolt is of predetermined and sufficient length so that, when the securing bolt head is seated against the first upright member, the securing bolt shaft passes through both of the registered openings and penetrates a predetermined length beyond the second upright member. The bore is positioned along the securing bolt shaft within the "U"-shaped channel. This allows a padlock shackle to be inserted through the bore so as to secure the securing bolt onto both of the upright members and at the same time protect the padlock shackle from being cut.

When the anti-theft device is in place, the coupler lever movement is blocked, the socket is obstructed and the padlock is protected.

Accordingly, it is a principal object of the invention to provide a device which prevents unauthorized towing of a gooseneck trailer.

It is another object of the invention to provide a device which obstructs both a socket of a trailer hitch as well as the movement of a trailer's coupling lever.

It is a further object of the invention to provide a device that can be inserted into a trailer hitch socket with one hand.

Still another object of the invention is to provide a device which, during the course of its ordinary use, prevents cutting devices from disabling the padlock or similar lock used to secure the device.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
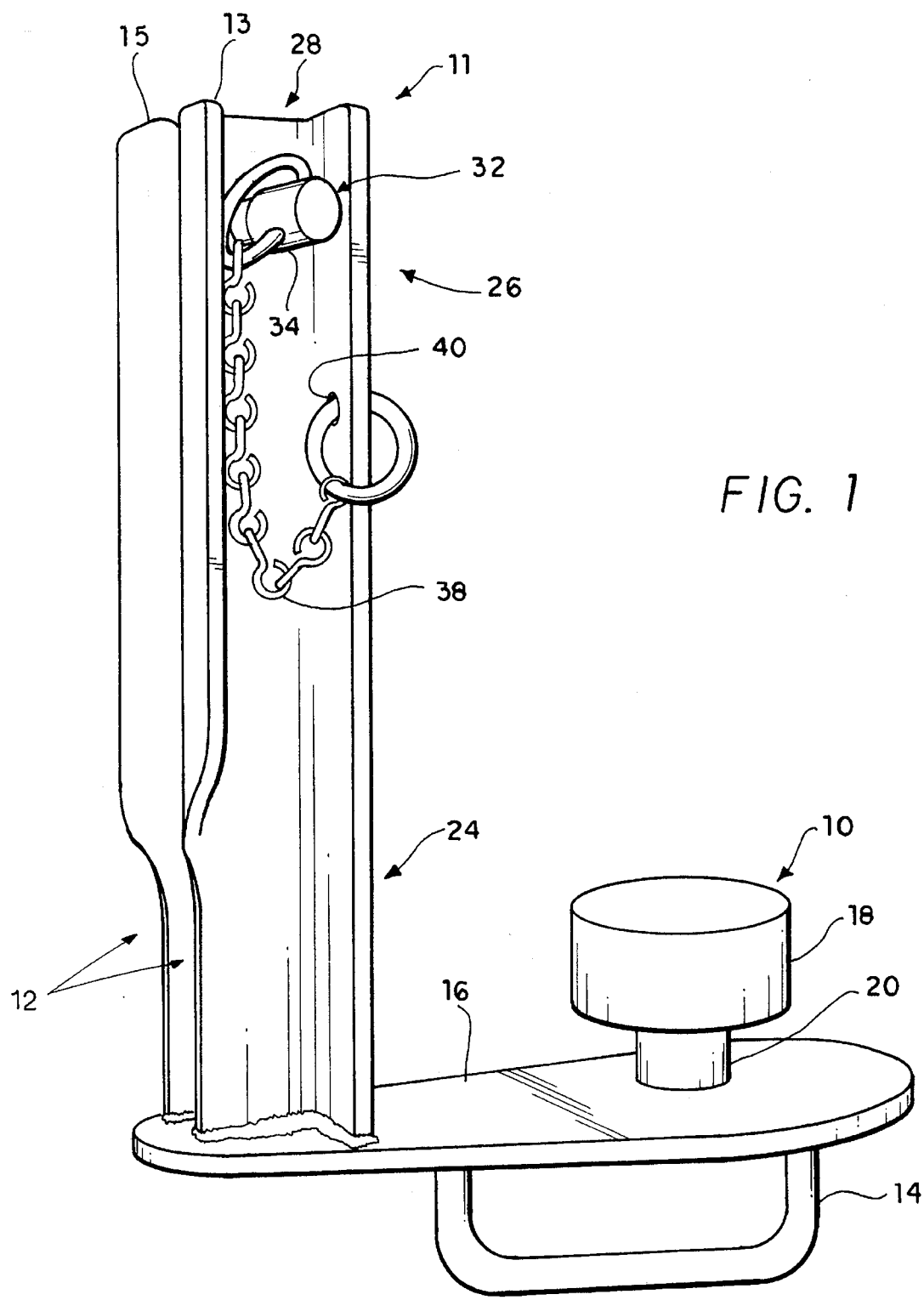
FIG. 1 is an isometric view of the preferred embodiment of the gooseneck trailer hitch locking device.
Figure 3:
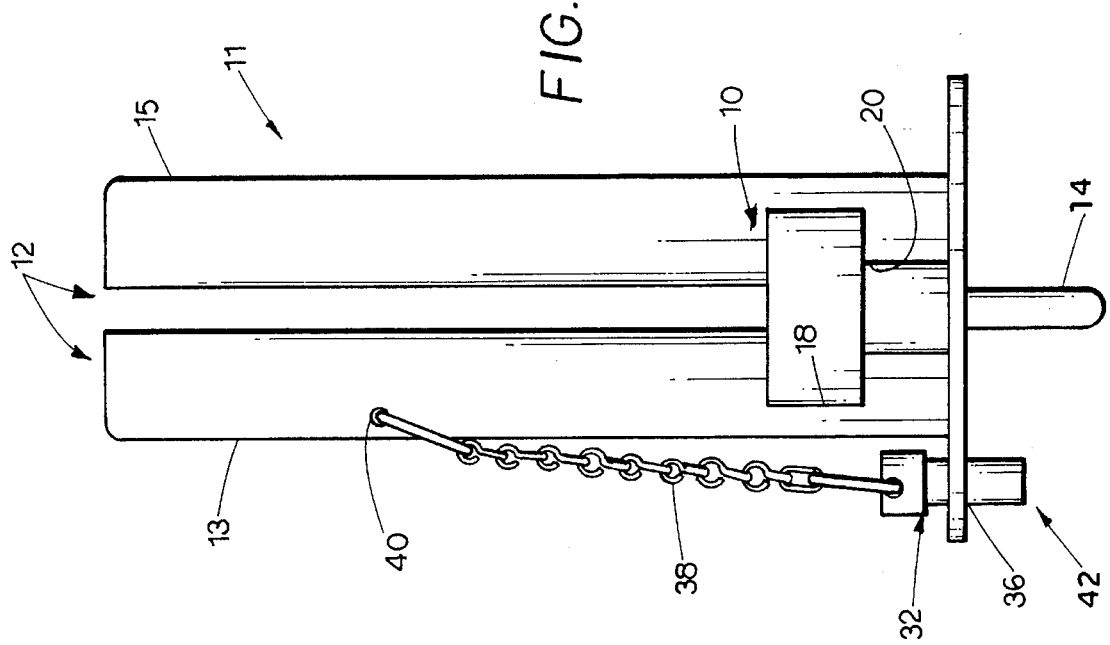
FIG. 3 is a front elevational view thereof.

The present invention relates to an anti-theft device which obstructs the socket and coupler lever of a gooseneck trailer hitch coupling mechanism and prevents the gooseneck trailer from being towed.

Referring to FIGS. 1, 2, 3, and 4, the preferred embodiment of the anti-theft device 1t is shown made up of a receiving device 10, a pair of upright members 12, and a handle 14, each permanently affixed to a plate 16, said plate having an topside and an underside. The receiving device 10 is a cylinder 18 affixed to a post 20, which in turn is affixed to the plate 16. The receiving device 10 should be dimensioned and configured so as to matingly engage with a socket of the gooseneck trailer hitch; however, any configuration, such as a standard ball from a ball hitch may be used. The handle 14 is affixed to the underside of the plate 16 generally centered under the receiving device 10.

Each of the upright members 12, comprising a first upright member 13 and a second upright member 15, are affixed at a right angle to the plate 16 on the topside of the plate, the topside being the same side as that side on which the receiving device 10 is mounted. As can be best appreciated from FIGS. 3 and 4, the first upright member 13 and second upright member 15 are affixed parallel to each other, spaced a predetermined distance apart. As can best be appreciated from FIGS. 5 and 6, this space allows the first upright member 13 and second upright member 15 to extend contiguously upward on opposite sides of the coupler lever L.

Figure 2:
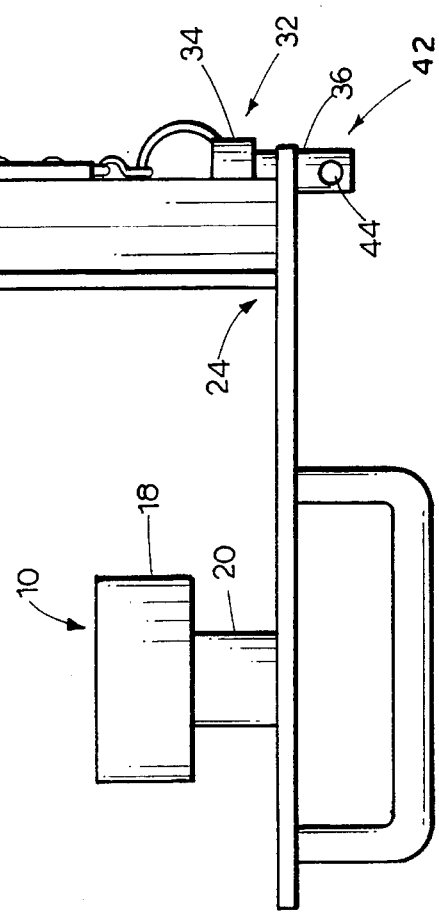
FIG. 2 is a side elevational view thereof.
Figure 4:
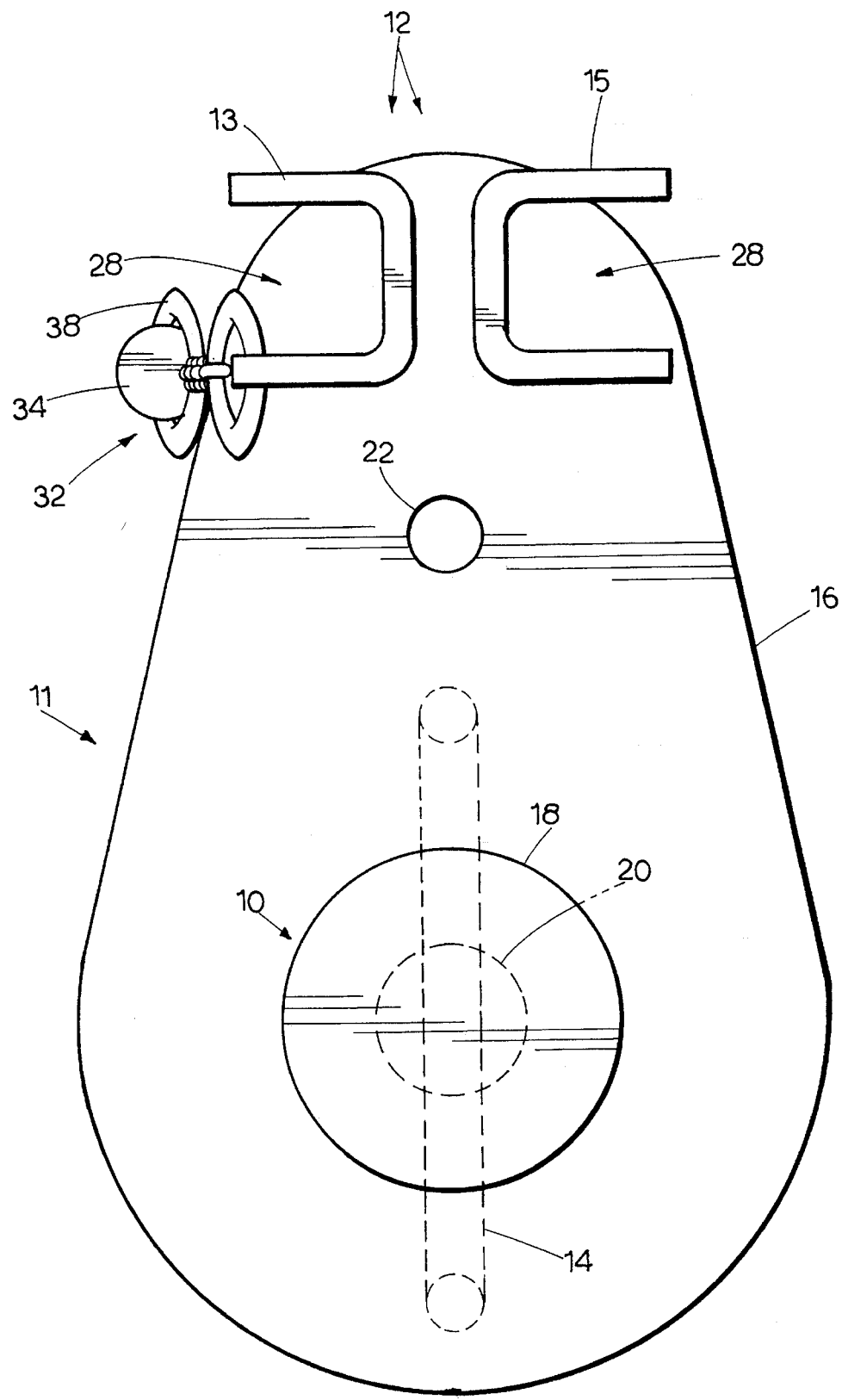
FIG. 4 is a top view thereof.

Referring to FIGS. 1, 2 and 4, each of the pair of upright members 12, each having a lower end 24 and an upper end 26, are formed so that the upper end forms a "U"-shaped channel 28. Each of the upper ends of the upright members 12 define an opening 30. Each of the openings 30 are in registry. The diameter of the registered openings 30 are dimensioned so that it allows a securing bolt 32, having a shaft 36 of a substantially same diameter as the diameter of the registered openings 30, to pass through the registered openings unhindered. As can be best appreciated from FIG. 1, the securing bolt 32 has a head 34 which prevents further passage of the securing bolt 32 through the registered openings.

As shown in FIGS. 2, 3, 4 and 5, the securing bolt 32 may be suspended by a chain 38 to prevent the securing bolt from becoming inadvertently misplaced. The securing bolt 32 is shown suspended by the chain 38 connected to an aperture 40 in an upright member 12. The distal end 42 of the securing bolt 32 includes a bore 44 to accept the shackle of a padlock or other similar lock. The securing bolt 32 is of predetermined and sufficient length so that, when the securing bolt head is seated against the first upright member, the securing bolt shaft passes through both of the registered openings and penetrates a predetermined length beyond the second upright member.

Figure 5:
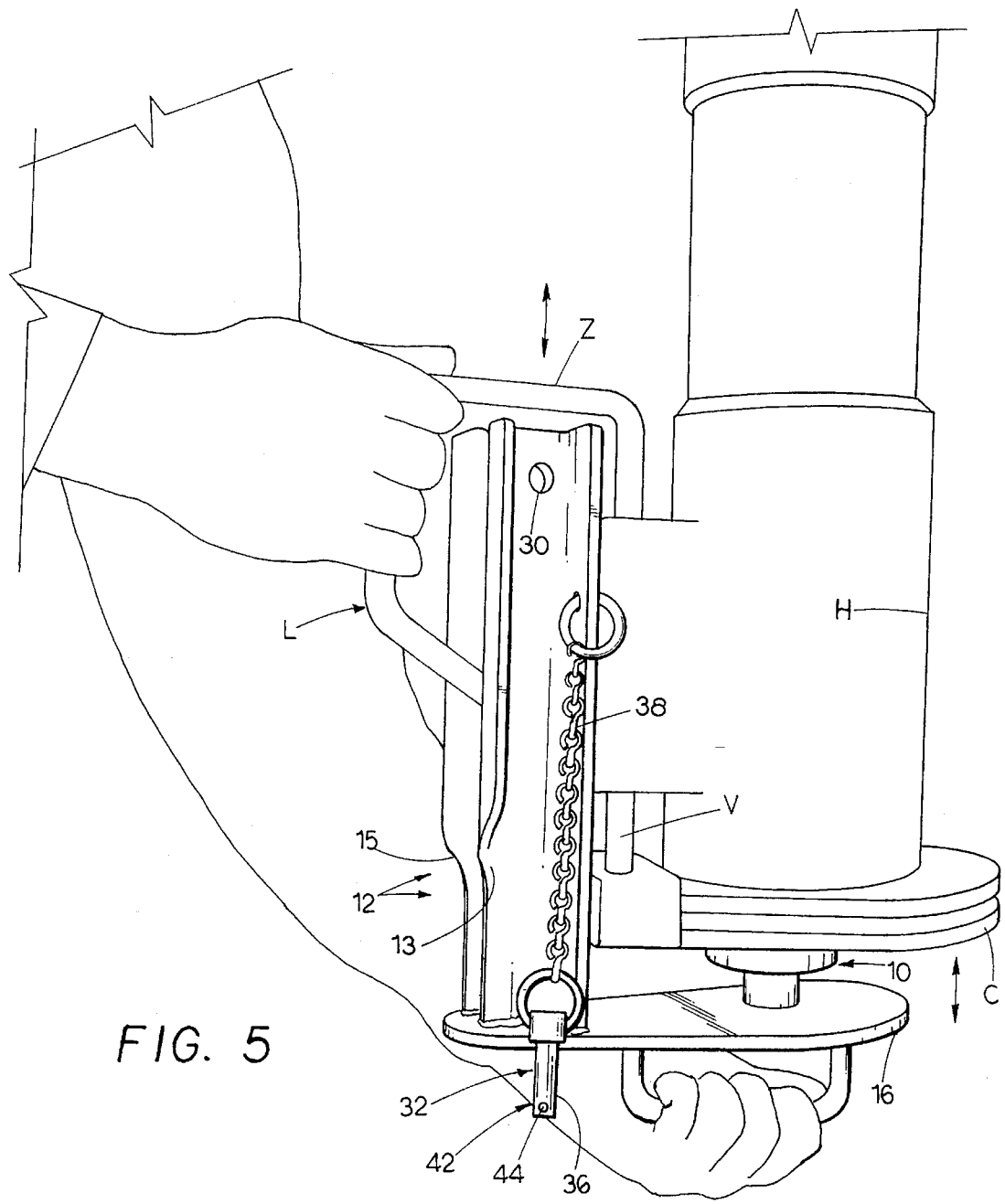
FIG. 5 is an environmental view of the gooseneck trailer hitch locking device partially installed onto a trailer hitch.
Figure 6:
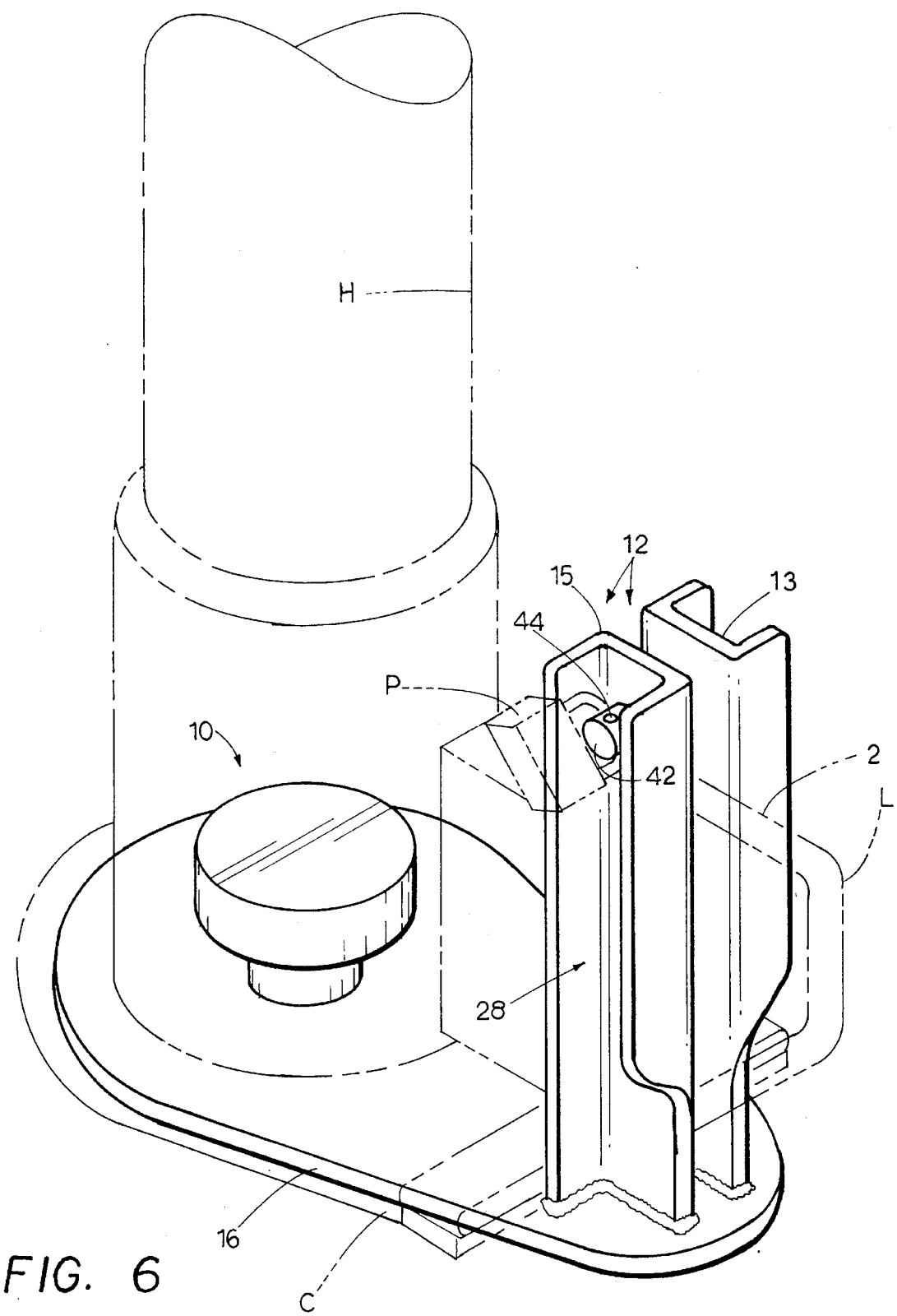
FIG. 6 is an environmental view of the gooseneck trailer hitch installed and locked onto a trailer hitch.

Referring to FIG. 6, the plate 16 is shown to be elongated and dimensioned to generally match the footprint of a coupler C of a gooseneck trailer hitch H. The elongated shape of the plate 16 provides an integral and rigid connection between the receiving device 10 and the upright members 12. This rigid assembly enables the anti-theft device 11 to be simply secured by a padlock P while obstructing both the coupler lever L as well as the socket of the gooseneck trailer hitch H. As represented in FIG. 5, a user grasps the handle 22 with one hand, while positioning the coupler lever L with the other hand in the open position. The receiving device 10 is shown partially inserted from below the coupler C into the gooseneck trailer hitch socket, while simultaneously positioned so that the coupler lever L is located between each of the upright members 12. The coupler lever L is shown in a temporary position in which the horizontal component Z of the coupler lever L is being held at a point above the ends of the upright members In contrast, FIG. 6 illustrates the position of the anti-theft device 11 after it has been inserted fully into the socket and is engaged in the closed position. As can be observed, the coupler lever L has been released, and the coupler lever is shown in its resting position. This position places the horizontal component Z of the coupler lever L at a point below the upper end of the upright members 12. The registered openings 30 are positioned so as to allow the securing bolt 32 to pass immediately above the horizontal component Z of the coupler lever L while in its resting position. This enables the anti-theft device 11 to be secured to prevent removal when reversing the installation procedure described above. Referring to FIG. 4, a plate opening 22 to allow penetration of the plate 16 by the vertical member V of the coupler lever L when in the closed position is shown.

FIG. 6 shows the distal end 42 of the securing bolt is shown protruding beyond through the registered openings 30 above the horizontal component Z of the coupler lever L. The bore 44 is positioned along the distal end 42 within the "U"-shaped channel. The shackle of a padlock P is shown inserted through the bore 44 so as to secure the securing bolt 32 onto both of the upright members 12 and at the same time protect the padlock shackle from being cut. The use of a padlock P or similar locking device secures the entire assembly when the securing bolt 32 is in place. The "U"-shaped channel 28 is dimensioned so that the body of a padlock P fits snugly within and against the walls of the "U"-shaped channel The body of the padlock P faces outward so as to provide access to the padlock key cylinder, whereas the shackle is protected within the walls of the "U"-shaped channel 28. Although a padlock P is shown, other locking devices can be used, such as, variously referred to, a "SHELTON INDUSTRIES ⅝ inch coupler lock" and a "FULTON TRAILER coupler lock", being of similar dimension to a padlock.

It is to be understood that the present invention is not limited to the embodiment described above, but encompasses any and all embodiments within the scope of the following claims.

I claim:

1. A gooseneck trailer hitch locking device comprising:
   receiving means adapted to receive the socket of a gooseneck trailer hitch; and
   coupler lever obstructing means adapted to obstruct the movement of a gooseneck trailer hitch coupler lever, said coupler lever obstructing means integrally cooperating with said receiving means by means of a rigid communicating member,
   whereby an integral assembly is defined which may be positioned onto a gooseneck trailer hitch to occlude simultaneously the use of the coupler lever and the socket.

2. The locking device according to claim 1, further comprising a non-integral securing means adapted to prevent removal of said integral assembly from the socket and coupler lever.

3. The locking device according to claim 1, further comprising a handle by which said integral assembly may be grasped.

4. The locking device according to claim 1, wherein said receiving means is a towing post.

5. The locking device according to claim 1, wherein said rigid communicating member is a plate.

6. The locking device according to claim 1, wherein said coupler lever obstructing means further comprises a plurality of upright members, said plurality of upright members further comprising at least a first upright member and a second upright member, each upright member having a first end and a second end, each said first end being affixed to said rigid communicating member at an approximate right angle, and said first upright member and said second upright member being so affixed in a substantially parallel relation to each other at a predetermined distance apart.

7. The locking device according to claim 6, further comprising
   a securing bolt; and,
   wherein each said upright member defines an opening near the second end, said opening of said first upright member being in registry with said opening of the second upright member, each said opening adapted to receive the securing bolt, said securing bolt having a shaft of a predetermined length and of a substantially same cross section as the cross section of the registered openings enabling the securing bolt to pass through the registered openings unhindered.

8. The locking device according to claim 7 wherein said securing bolt, having a proximate and a distal end, has a head on said proximate end so as to prevent passage of said securing bolt entirely through said registered openings, and a bore in said distal end.

9. The locking device according to claim 7, further comprising a suspending means for flexibly connecting said securing bolt to said locking device.

10. A gooseneck trailer hitch locking device comprising:

a plate;

a towing post adapted to receive the socket of a gooseneck trailer hitch;

a plurality of upright members, said plurality of upright members further comprising at least a first upright member and a second upright member, each upright member having a first end and a second end, each said first end being affixed to said plate at an approximate right angle, and said first upright member and said second upright member being so affixed in a substantially parallel relation to each other at a predetermined distance apart whereby the movement of a gooseneck trailer hitch coupler lever is substantially obstructed;

said plate, said towing post, and said upright members being integrally and fixedly affixed in relation to one another whereby an integral assembly is defined which may be positioned onto a gooseneck trailer hitch to occlude simultaneously the use of the coupler lever and the socket.

11. The locking device according to claim 10, further comprising a handle for grasping said locking device, said handle being integrally affixed to said locking device.

12. The locking device according to claim 10, further comprising a securing bolt; and wherein each upright member defines an opening near the second end, said opening of said first upright member being in registry with said opening of the second upright member, each said opening adapted to receive a securing bolt, said securing bolt having a shaft of a predetermined length and of a substantially same cross section as the cross section of the registered openings enabling the securing bolt to pass through the registered openings unhindered.

13. The locking device according to claim 12 wherein said securing bolt, having a proximate and a distal end, has a head on said proximate end so as to prevent passage of said securing bolt entirely through said registered openings, and a bore in said distal end.

14. The locking device according to claim 12, further comprising a suspending means for flexibly connecting said securing bolt to said locking device.

* * * * *